MAGNETIC TAPE DICTATING MACHINE OF THE SELF-THREADING TYPE
Filed Oct. 23, 1963
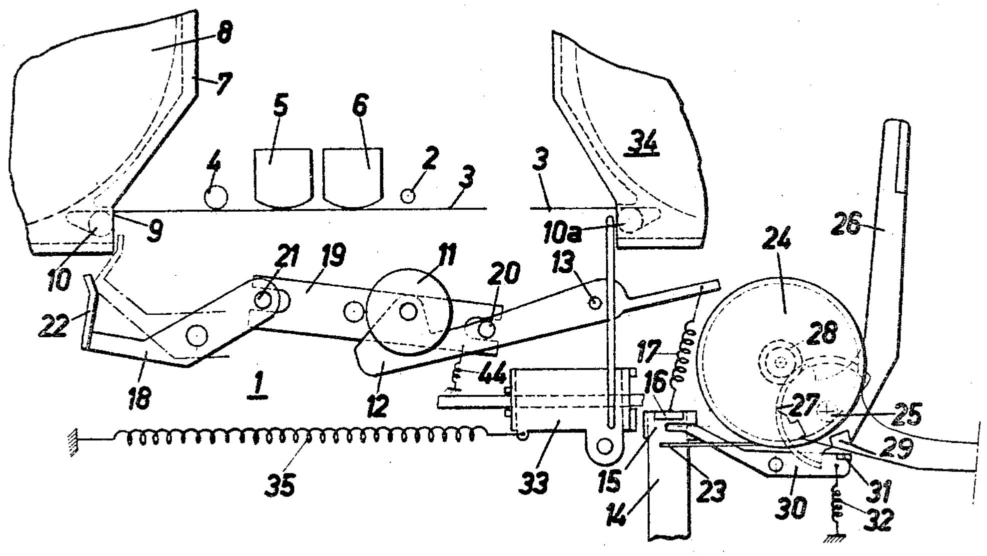
INVENTOR.
FRIEDRICH LOUZIL
BY
Frank R. Trifari
AGENT

United States Patent Office 3,311,314

Patented Mar. 28, 1967

3,311,314

MAGNETIC TAPE DICTATING MACHINE OF THE SELF-THREADING TYPE

Friedrich Louzil, Vienna, Austria, assignor to North American Philips Company, Inc., New York, N.Y., a corporation of Delaware Filed Oct. 23, 1963, Ser. No. 318,425
Claims priority, application Austria, Nov. 27, 1962, A 9,286/62
5 Claims. (Cl. 242—55.13)

This invention relates to a magnetic tape recorder/reproducer of the self-threading type and particularly useful as a dictating machine.

In a dictating machine of this type the tape may be transferred from one cartridge to another and therefore a tag is attached at each end of the tape. Thus, when a supply of tape is placed on the machine a tag is available for transferring the tape from the supply to a take-up reel and once the tape is fully wound on the take-up reel a tag must be available for removing the tape for transcription.

During recording operation of tape recorders the magnetic tape is driven by a capstan and pressure roller between which the magnetic tape passes in the known manner. However, since the tape has a tag at each end, or at least at the trailing end of the magnetic tape, which leaves the supply magazine and enters a separate take-up magazine, provision must be made to prevent the trailing tag from entering between the engaged capstan and pressure roller.

Devices are known which automatically separate the pressure roller from the capstan since the operator of the dictating machine cannot be expected to manually perform this function. However, the devices herefore proposed and utilized have been complex and expensive.

The primary object of this invention therefore is to provide a device which prevents the trailing tag from entering between the engaged capstan and pressure roller and is simple, inexpensive and highly reliable in operation.

Briefly, the invention comprises a mechanical linkage for moving the pressure roller into and out of engagement with the driving capstan and at the same time moves a blocking member into a position which allows a trailing tag to freely emerge from a supply magazine, and when the pressure roller is positioned for driving the tape, the blocking member prevents emergence of the trailing tag from the supply magazine. A significant increase in tension of the tape may be used for automatically stopping the tape drive mechanism according to known techniques and devices.

In accordance with the presently preferred embodiment of an automatic or self-threading magnetic tape recorder/reproducer dictating machine, the magnetic tape is contained on a single reel housed in a supply magazine or cassette. A tag is provided at each end of the tape so that it can be withdrawn from a supply magazine for recording and can also be withdrawn from a take-up magazine when removed from or replaced on the same or another machine for transcribing the said recording. Therefore, the recorder/reproducer apparatus according to the invention is also provided with means for rendering the tape transfer mechanism, in the form of a reciprocal slide, inoperative when the pressure roller lies in the path of the tag.

The invention will now be described in connection with the annexed drawing showing a simplified plan view of the presently preferred embodiment of the invention.

Referring now to the figure, a chassis plate 1 supports a capstan 2 for driving a tape 3 which passes over heads 5 and 6 with the aid of a tape guiding device 4 as is known. The figure shows only that part of a magazine 7 containing a supply reel 8 and adapted to be placed on the apparatus in any suitable manner. The tape 3 emerges from a lateral aperture 9. A tag 10 at the trailing end of the tape is shown about to emerge from the aperture 9 at the left in the figure. A tag 10*a* at the leading end of the tape is shown entering a like aperture of a take-up magazine 34.

A pressure roller 11 is supported by a support 12 in the form of a lever of the first class i.e. the lever having two arms which is pivotable about a pin 13 mounted on the chassis plate 1. A retracting spring 44 maintains the support 12 in the position in which the pressure roller 11 is moved away from the capstan 2. The support 12 is pivoted by a bent lever or bell crank 14 which is pivotable about a pin or line 15 and is either actuated by means of a push-button or forms part of a push-button arrangement. A limb 16 of the lever 14, which limb points away from the chassis plate 1, that is to say upwards, is connected to the support lever 12 by a strong spring 17 which determines the pressure of the pressure roller 11.

The aperture 9 in the magazine 7 can be partly blocked by a pivotable lever 18 upon movement of the support 12 transmitted thereto with the aid of an intermediate lever 19 which cooperates with pins 20 and 21 on the support lever 12 and blocking lever 18 respectively. The position occupied by a tongue 22 of the blocking lever 18 when the pressure roller 11 is urged to the capstan 2, is shown by broken lines. In the broken line position of the blocking lever 18 the tape 3 is allowed to emerge from the magazine 7, but the tag 10 is held within the aperture 9 and hence cannot run into the space in front of the heads and between the capstan 2 and the pressure roller 11 only to get stuck there and be separated from the tape.

Furthermore, in the apparatus shown a known device 33 is provided, with the aid of which a tag 10*a*, which is attached to the beginning of a coil of tape and in its initial position lies within the aperture 9, can be caught and conveyed to a take-up device 34 located at the right-hand side. The rest position of the reciprocable device 33, which position is determined by a spring 35, is at the left hand side adjacent the magazine 7. A rope 23, which is adapted to be wound on a wheel 24, is provided to move the device 33 from its rest position in order to convey one end of the tape 3, from magazine 7 to the take-up magazine 34. A lever 26 adapted to pivot about a shaft 25 is provided for turning the wheel 24. This lever is provided with a toothed rack 27, which meshes with a pinion 28 of the wheel 24. With a suitable choice of the gear ratio a comparatively slight pivotal movement of the lever 26 is sufficient to produce the required number of revolutions of the wheel 24. That is, pulling lever 26 down, from the vertical position shown to the horizontal position rotates the wheel 24 in a counterclockwise direction and pulls device 33 to the right in the figure. When the lever 26 is released the device 33 is moved to the left by spring 35 and lever 26 returns to its vertical position. If capstan 2 and roller 11 are engaged tongue 31 of lever 30 is engaged in recess 29 of lever 26 so that lever 26 cannot be moved, and hence the entire arrangement for catching and conveying the tag 10*a* is blocked. The pivotal movement of the lever 30 is effected by the lever or bell crank 14 operating the support 12 of the pressure roller 11. Thus, when the pressure roller is in the position shown in the drawing the lever 26 is free to move. When the pressure roller is against the capstan the lever 30 is pivoted so that tongue 31 engages in slot 29 of lever 26 to block its movement. The rest position of the lever 30 is determined by a spring 32.

In the embodiment described with reference to the figure the member for blocking the aperture 9 in the casing of the magazine is in the form of a lever 18, which is operated by movement of the support 12 of the pressure roller 11 and hence by the device for controlling this pressure roller. It will be readily appreciated that numerous modifications are possible without departing from the scope of the invention. For example, the lever 18 may be replaced by a sliding pin or by a member rigidly secured to the support 12 of the pressure roller. The blocking member 18 may also be directly operated by the bent lever 14 associated with the pressure roller 11, in the same manner as described with respect to the member 30 for blocking the device for catching and conveying the tag.

I claim:

1. The combination with a magnetic tape recorder/reproducer having a separate supply magazine and a take-up magazine comprising a tag at each end of said magnetic tape, movable means for engaging the tag at the leading end of said tape for moving said tag and tape from said supply magazine to said take-up magazine, a capstan and movable pressure roller means for driving said tape in a direction toward said take-up magazine, and blocking means operatively connected with said pressure roller means for blocking emergence from the supply magazine of the tag at the trailing end of said tape, wherein said pressure roller means comprises a pivotal lever of the first class supporting a pressure roller at one end and means for moving said lever to engage and disengage said pressure roller and capstan, said blocking means comprises a pivotal blocking lever adjacent said supply magazine, and an intermediate pivotal lever having one end connected with said blocking lever and the other end connected with said first class lever with said blocking lever being positioned to block egress of the said trailing tag from said supply magazine when said pressure roller is positioned adjacent said capstan.

2. The combination with a magnetic tape recorder/reproducer having a separate supply magazine and a take-up magazine comprising a tag at each end of said magnetic tape, movable means for engaging the tag at the leading end of said tape for moving said tag and tape from said supply magazine to said take up magazine, a capstan and movable pressure roller means for driving said tape, and blocking means operatively connected with said pressure roller means for blocking emergence from the supply magazine of the tag at the trailing end of said tape when said pressure roller is positioned adjacent said capstan and a second blocking means operatively connected with said pressure roller means for blocking movement of said movable means when said pressure roller is positioned adjacent said capstan and said movable means is positioned adjacent said supply magazine.

3. The combination according to claim 2 wherein said pressure roller means comprises a pivotal lever of the first class supporting a pressure roller at one end and means for moving said lever to engage and disengage said pressure roller and capstan, said blocking means comprises a pivotal blocking lever adjacent said supply magazine, and an intermediate pivotal lever having one end connected with said blocking lever and the other end connected with said first class lever whereby said blocking lever is positioned to block egress of the said trailing tag from said supply magazine.

4. The combination according to claim 2 wherein said movable means comprises a slide movable between said supply and take-up magazines, a pulley having a flexible cord wound thereon, one end of said cord being connected to said slide, and a rack and pinion assembly including a handle for rotating said pulley to move said slide.

5. The combination according to claim 4 wherein said second blocking member comprises a pivotal lever operatively connected with said pressure roller means at one end, the other end of said lever being engageable with said rack and pinion assembly to prevent operation thereof when said pressure roller is positioned adjacent said capstan.

References Cited by the Examiner

UNITED STATES PATENTS

| | | | |
|---|---|---|---|
| 3,104,843 | 9/1963 | Missriegler et al. | 242—55.13 |
| 3,154,236 | 10/1964 | Louzil | 242—71.1 X |
| 3,195,824 | 7/1965 | Laa et al. | 242—55.13 |

FRANK J. COHEN, *Primary Examiner.*

GEORGE F. MAUTZ, *Examiner.*